F. BEAN.
APPARATUS FOR LIGHTING AND EXTINGUISHING GAS BY ELECTRICITY.
No. 108,434.  Fig. 1  Patented Oct. 18, 1870.
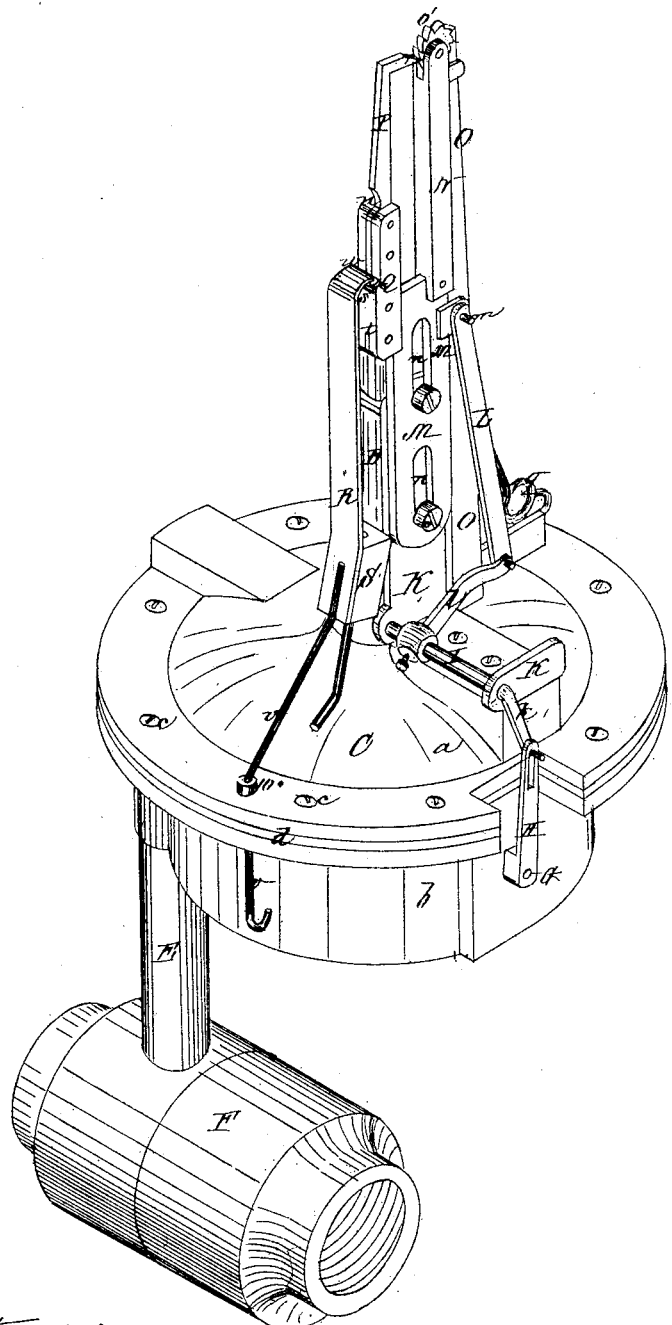
Witnesses
Inventor,
Frank Bean 3 Sheets—Sheet 2

F. BEAN.
APPARATUS FOR LIGHTING AND EXTINGUISHING GAS BY ELECTRICITY.

No. 108,434. Patented Oct. 18, 1870.

3 Sheets—Sheet 3.
F. BEAN.
APPARATUS FOR LIGHTING AND EXTINGUISHING GAS BY ELECTRICITY.
No. 108,434. Patented Oct. 18, 1870.
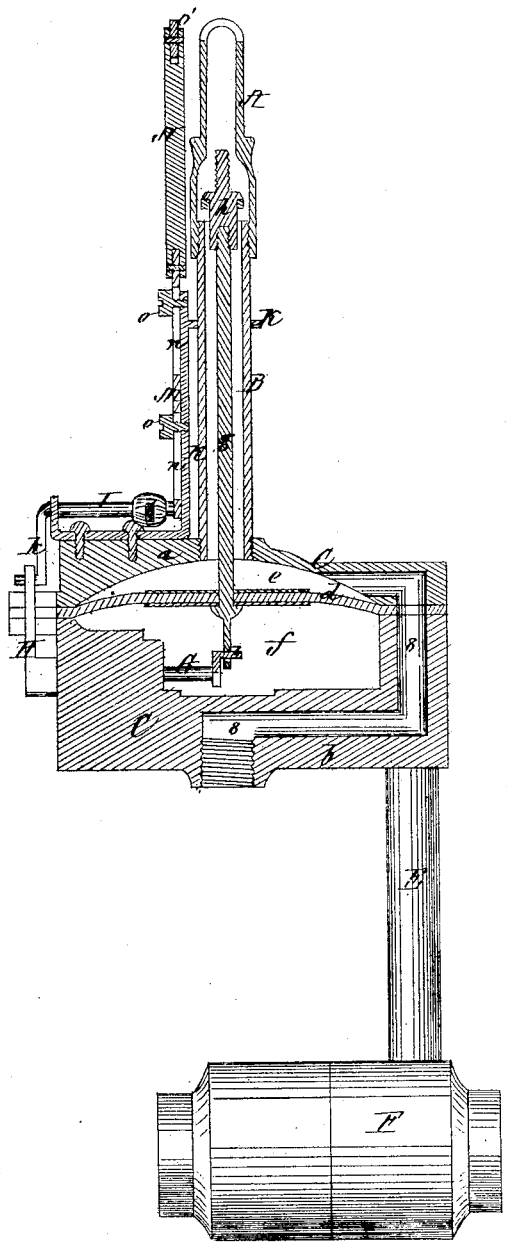
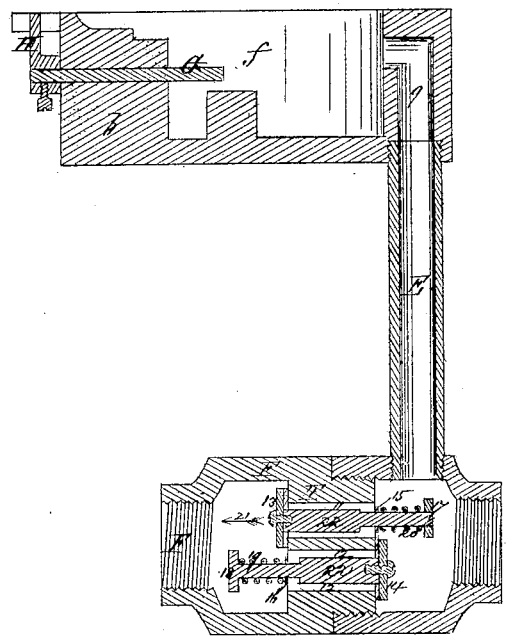
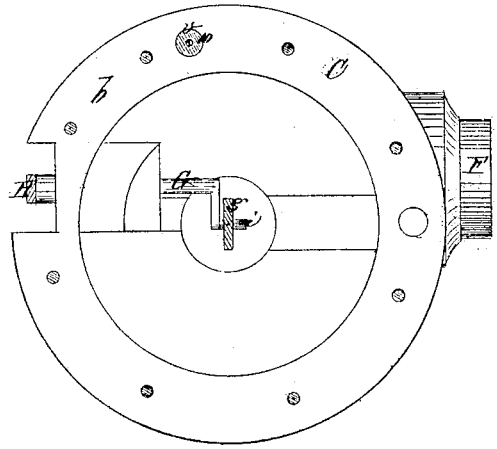
Witnesses,
Inventor,
Frank Bean

United States Patent Office.

FRANK BEAN, OF SOMERVILLE, ASSIGNOR TO EDWIN E. BEAN, OF BOSTON, MASSACHUSETTS.

Letters Patent No. 108,434, dated October 18, 1870.

IMPROVEMENT IN APPARATUS FOR LIGHTING AND EXTINGUISHING GAS BY ELECTRICITY.

The Schedule referred to in these Letters Patent and making part of the same.

*To all whom it may concern:*

Be it known that I, FRANK BEAN, of Somerville, in the county of Middlesex and State of Massachusetts, have invented a Pneumatic Apparatus for Lighting and Extinguishing Gas by Electricity, of which the following is a full, clear, and exact description, reference being had to the accompanying drawing making part of this specification, in which—

Figure 1 is a perspective view, illustrating my invention.

Figure 3 is a longitudinal vertical section on the line *x x* of fig. 2.

Figure 4 is a vertical section on the line *y y* of fig. 2.

Figure 5 is a transverse section on the line *z z* of fig. 2.

Figure 6 is a modification, to be referred to.

Figure 6:
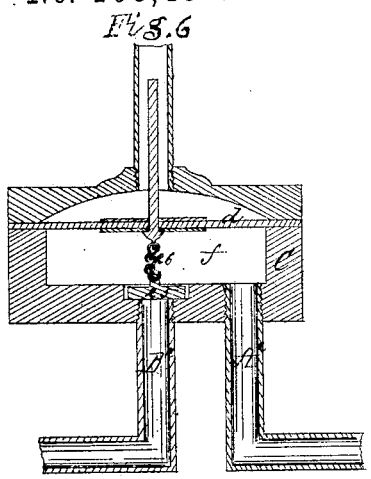
Figure 2:
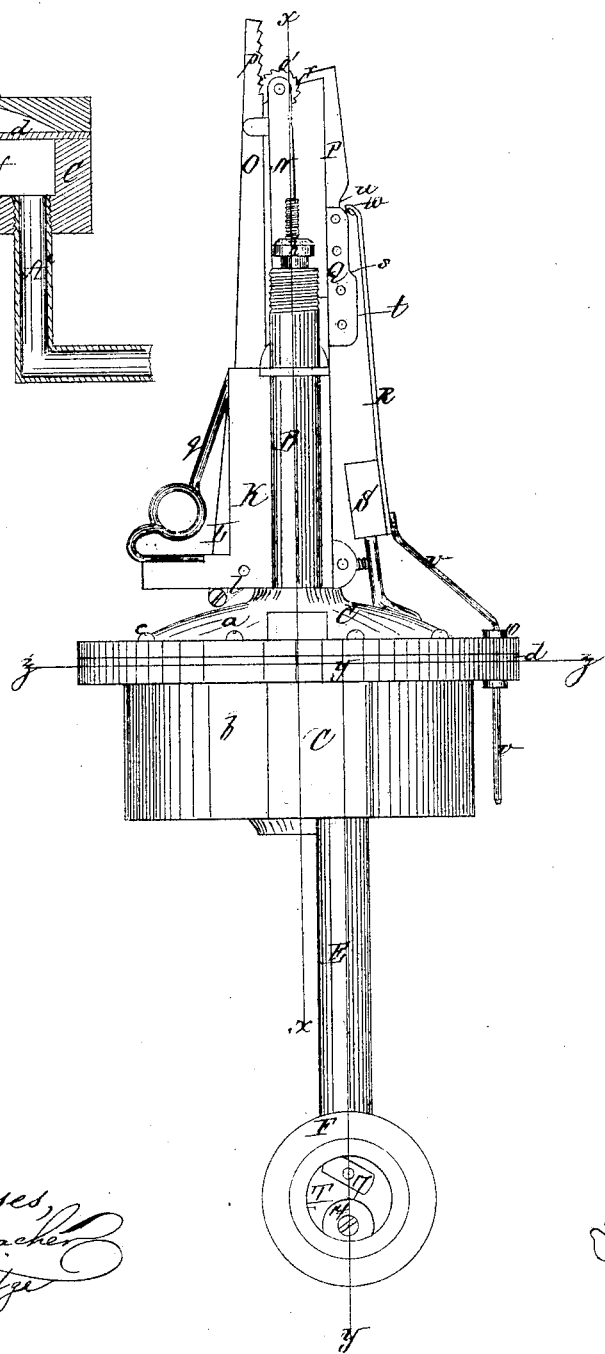
Figure 2 is a rear elevation of the same, the gas-burner being removed and the position of some of the parts being changed.

To provide a means for immediately lighting and extinguishing gas-lamps, without the usual labor and expense attending the ordinary method of lighting and extinguishing each one by hand, is the object of my invention, which consists in operating the valves which control the admission of gas to the burners of a series of gas-pipes by pneumatic power, in combination with mechanism, also operated by pneumatic power, for making and breaking the electric circuit, to produce the sparks for igniting the gas in the series of burners, the exhaustion of the air serving to close the valves in the burners, and, by cutting off their supply of gas, causing the lights to be extinguished as desired.

To enable others skilled in the art to understand and use my invention, I will proceed to describe the manner in which I have carried it out.

In the said drawing—

A is one of a series of gas-burners, screwed to the top of a short pipe, B, the lower end of which passes into a circular box or casing, C, secured to the top of a vertical gas-pipe, connected with the main supply-pipe, not shown.

This circular box is formed in two portions, *a b*, screwed together at *c*, and incloses a chamber, extended across which is a flexible diaphragm, *d*, dividing it into two compartments, *e f*, with the former, *e*, of which the pipe supplying the gas communicates, through a passage, 8, while a vertical pipe, E, leading from a pipe, F, (connected with an air-pump not shown,) communicates with the compartment *f* through a passage, 9.

To the center of the diaphragm *d* is secured the bottom of a rod, *g*, which passes up through the center of the pipe B, and carries at its upper end a valve, *h*, which is raised from and lowered upon its seat at the top of the pipe B, to open and close the passage to the burner A.

Passing through the side of the casing, and into the interior of the compartment *f*, is a rocker-shaft, G, on the inner end of which is a crank or arm, *i*, to which is connected the slotted end of the rod *g*, which is secured to the diaphragm, and projects slightly below its lower surface for this purpose, and as the valve-rod *g* is raised or lowered by the movement of the diaphragm, the shaft G is rocked, and its motion communicated to mechanism now to be described.

The end of the rocker-shaft G outside the casing is provided with a slotted arm or crank, H, which moves a crank, *k*, on the outer end of another short rocker-shaft, I, which has its bearings in the foot of an upright frame or support, K, through the upper end of which passes the pipe B.

From one side of the rocker-shaft I projects an arm, *l*, to the outer end of which is pivoted the lower end of a connecting-rod, L, the upper end of which is connected with a stud, *m*, extending out from a plate, M, which is provided with slots, *n*, through which screw-pins *o* pass into the frame or support K, to guide it when moved up and down thereon.

Pivoted to one side of the top of the slotted plate M, and rising therefrom, is a vertical bar, N, in bearings, in the top of which is placed a toothed or ratchet-wheel, *o'*, which engages (on one side) with a rack, *p*, on the upper end of a vertical post, O, the lower end of which is secured to the frame or support K, and is pressed constantly by a spring, *q*, against the ratchet-wheel *o'*, so as to insure its meshing with the rack *p*, and being constantly kept in contact with the pointed end *r* of the metallic bar P, which is secured, at its lower end, to the top of the slotted plate M, on the side opposite to that where the bar N is secured.

Q is a strip of ivory or other substance which is a non-conductor of electricity, and incloses the opposite sides of the lower end of the metallic bar P, being snugly secured in contact therewith by rivets or otherwise.

The lower portion of this ivory strip is of greater width, and projects out so as to form a shoulder, *s*, from which point to a point, *t*, (a short distance below,) the edge of the bar P is covered by the ivory strip.

The metallic bar P is also provided with a notch, *u*, at a point just above the top of the ivory strip, which construction is for a purpose now to be explained.

To one of the poles of a battery is connected the lower end of a wire, *v*, which passes through a nonconductive or insulating substance, 10, set into the edge of the circular casing C, and leads upward, and is secured to the lower end of a flat spring, R, attached to an insulating block, S, the upper end of the spring R being provided with a projection, w, which (when the bar P is up to the extent of its traverse) is pressed by the force of the spring, against the portion s t of the ivory strip, which covers the edge of the metallic bar P, thus preventing the electric current from passing up to the point r of the bar P, in contact with the ratchet-wheel o', and thus preventing the production of the sparks which light the gas issuing from the burner.

The other pole of the battery is connected with the toothed wheel o' by any suitable conductor.

When, however, this bar descends, the projection w comes in contact with the exposed edge of the bar P, from s to u, and the current is not interrupted in its passage to the point r in contact with the ratchet-wheel o', and as the wheel moves down on the rack p, and the teeth revolve under and temporarily pass from contact with the point r of the bar P, the sparks are produced which, on account of their proximity to the tip of the burner, ignite the gas issuing therefrom.

Just previous, however, to the completion of the descent of the bar P, the notch u reaches the projection w, when the contact between the latter and the bar P is broken, and the force of the current will then be concentrated on the next burner of the series, as required.

It will be seen that the descent of the bars N and P serves to carry the wheel o' and point r down below the flame issuing from the burner, and they are thus prevented from being injured or destroyed thereby.

The methods heretofore employed for igniting gas by electricity have been either to employ an intense or induced current of electricity, which produced a series of sparks by leaping over a break or interruption in the conductor at the tip of the burner, or to pass a current of electricity through a small platinum wire (placed over the tip of the burner) until it became heated sufficiently to ignite the gas.

The first of these methods requires the conductor to be heavily coated, in order to secure the necessary insulation to prevent the escape of the electricity, while, when the platinum wire is employed, it is difficult to regulate the force of the current, as an excess of electricity will melt the wire, while an insufficient current will not heat the wire enough to ignite the gas. An ordinary current of electricity will, however, produce a spark where the circuit is broken; and by the employment of a device for making and breaking the circuit in close proximity to the tip of the burner, as above described, I am enabled to employ an ordinary or comparatively feeble current of electricity for igniting the gas, instead of the induced current heretofore required to leap over the permanent break in the conductor at the tip of the burner, and a less perfectly insulated conductor may, consequently, be employed than heretofore.

The air-pipe F is provided with a series of pairs of valves, equal in number to the number of gas-lights used; and at each point where a vertical pipe, E, connects with the air-pipe is formed a partition or plug, T, provided with two circular passages, 11 12, see fig. 4, which are opened and closed by two valves, 13 14, the rods 22 of which pass centrally through the passages in opposite directions, and through cleats 15 16, bridged over the ends of the passages opposite to those closed by the valves.

The outer ends of the valve-rods are provided with enlargements 17 18, and between these enlargements and the cleats 15 16, the valve-rods are surrounded by spiral springs 19 20, which serve to insure the valves being brought in contact with their seats until the force of the air pumped into the air-pipe F, and that caused by the exhaustion of air therefrom, is sufficient to overcome the tension of the springs 19 20, when the valves are removed from their seats and open the passages 11 12.

The strength of the spring 19 is just sufficient to keep the valve on its seat when air is not forced into the pipe to operate the valves of the burners and mechanism for lighting the same; but when the air is pumped in, and the valve of the burner and mechanism connected therewith has been operated, the pressure against the inner end of the valve 13 carries it, against the resistance of the spring 20, in the direction of the arrow 21, and pushes the valve 13 off from its seat, thus opening the passage 11, and allowing the air to be forced through the portion of the pipe beyond to open the valve h, which controls the admission of gas to the next burner, and simultaneously therewith bringing the wheel o' of the next burner down, so that, when revolving, its teeth will temporarily be brought out of contact with the point r of the metallic bar P, so as to produce a series of sparks, (in a manner heretofore described,) which ignite the gas flowing up the burner.

When it is desired to extinguish the series of gas-lights, it is simply necessary to exhaust air from the first section of the pipe F, when the valve h, through the connections already described, will be closed, shutting off the supply of gas to the burner, and the current of electricity will be interrupted in its passage to the toothed wheel o'; and almost simultaneously with the shutting off of the gas from one burner, the resistance of the spring 19 will be overcome, and the valve 14 will open communication with the passage 12 and portion of the pipe beyond, and the exhaustion of the air therefrom will cause all of the burners to be extinguished as required.

The object of operating separately the valves controlling the admission of gas to the burners, is so that the electric current may be concentrated on one burner at a time, as, should it be acting simultaneously upon all of the burners of the series, it would require a separate conductor for each burner.

One valve may be arranged, as seen in fig. 6, so as to accomplish the same result produced by the employment of the valves 13 14. In this case an air-pipe, $A^2$, communicates with the lower compartment f of the casing C, and another pipe, $B^2$, leads therefrom to the lower compartment f of the next apparatus, and so on throughout the series.

On the top of the pipe $B^2$ rests a valve, 25, which fits into a suitable recess, and is connected by a short chain, 26, with the diaphragm d. On the air being forced into the compartment f, through the pipe $A^2$, the diaphragm is raised, and with it the valve h, the length of the chain 26 being such that the valve 25 will not be raised until the valve h and mechanism connected therewith have been operated, and the air is thus caused to act upon the mechanism of one apparatus and then pass on to the next one in the series, in the same manner as when two valves are employed.

When the gas is to be extinguished the air is exhausted from the compartment f through the pipe $A^2$, when the diaphragm d, and with it the valve h, are drawn down, shutting off the supply of gas, after which the partial vacuum in the compartment f causes the valve 25 to be raised off its seat, opening communication with the pipe $B^2$, from which the air is then exhausted to extinguish the light of the next apparatus, and so on throughout the whole series.

Instead of a valve, 25, a stop-cock may be employed, so arranged as to be opened and closed by the movement of the diaphragm.

Claims.

What I claim as my invention, and desire to secure by Letters Patent, is—

1. A mechanism, connected with the valve which controls the admission of gas to the burner, and operated simultaneously therewith by pneumatic power, for making and breaking the electric circuit, and thereby producing sparks for igniting the gas, substantially as described.

2. In combination with the air-pipe or pipes, one or more valves, operated by pneumatic power, and so constructed and arranged as to allow the air to pass successively from one apparatus to another, substantially as described.

3. The toothed wheel O' and the bar P, with its point r, or their equivalents, when applied to the burner A, for producing sparks during the passage of an electric current to ignite the gas, substantially as described.

4. The bar N with its wheel O', and the bar P with its point r, when so arranged that they can be raised and lowered, as and for the purpose set forth.

5. The bar P, with its non-conducting strip Q, operated by pneumatic power, in combination with the spring R, for making and breaking the electric circuit at the required time, substantially as described.

6. A pneumatic apparatus for operating the valve which admits the gas to the burner, in combination with an electrical apparatus for igniting the gas, substantially as described.

Witness my hand and seal, this 6th day of August, A. D. 1870.

FRANK BEAN. [L. S.]

Witnesses:
N. W. STEARNS,
W. J. CAMBRIDGE.